US009610500B2

(12) United States Patent
Colbert (10) Patent No.: US 9,610,500 B2
(45) Date of Patent: Apr. 4, 2017

(54) MANAGING VIRTUAL CONTENT BASED ON INFORMATION ASSOCIATED WITH TOY OBJECTS

(71) Applicant: Disney Enterprises, Inc., Burbank, CA (US)

(72) Inventor: Tyler James Colbert, West Jordan, UT (US)

(73) Assignee: Disney Enterprise, Inc., Burbank, CA (US)

( * ) Notice: Subject to any disclaimer, the term of this patent is extended or adjusted under 35 U.S.C. 154(b) by 241 days.

(21) Appl. No.: 13/841,813

(22) Filed: Mar. 15, 2013

(65) Prior Publication Data

US 2014/0274405 A1 Sep. 18, 2014

(51) Int. Cl.
*A63F 13/00* (2014.01)
*A63F 13/65* (2014.01)
*A63F 13/69* (2014.01)
*A63F 13/79* (2014.01)
*A63H 1/00* (2006.01)

(52) U.S. Cl.
CPC ............. *A63F 13/65* (2014.09); *A63F 13/69* (2014.09); *A63F 13/79* (2014.09); *A63H 1/00* (2013.01); *A63H 2200/00* (2013.01)

(58) Field of Classification Search
CPC ....... A63H 1/00; A63H 2200/00; A63F 13/00; A63F 13/65; A63F 13/69; A63F 13/79
USPC .......................................................... 463/36
See application file for complete search history.

(56) References Cited

U.S. PATENT DOCUMENTS

| 5,853,327 A | 12/1998 | Gilboa ............................ 463/39 |
| 6,190,174 B1 | 2/2001 | Lam ................................ 434/169 |
| 6,773,325 B1 | 8/2004 | Mawle et al. ................. 446/175 |
| 7,081,033 B1 | 7/2006 | Mawle et al. ................. 446/175 |
| 7,645,178 B1 | 1/2010 | Trotto et al. .................. 446/268 |
| 7,843,471 B2 | 11/2010 | Doan et al. .................... 345/633 |
| 7,878,905 B2 | 2/2011 | Weston et al. ................. 463/39 |
| 8,287,372 B2 | 10/2012 | Hong et al. ..................... 463/34 |
| 8,469,766 B2 | 6/2013 | Zheng ........................... 446/268 |

(Continued)

FOREIGN PATENT DOCUMENTS

| WO | WO 2005/0123210 | 12/2005 |
| WO | WO 2007/0101785 | 9/2007 |
| WO | WO 2008/132065 | 11/2008 |

*Primary Examiner* — Jason Skaarup
*Assistant Examiner* — Ryan Hsu
(74) *Attorney, Agent, or Firm* — Sheppard Mullin Richter & Hampton LLP (57) ABSTRACT

The system described in this disclosure may be configured to read information stored on toy objects that indicates whether the toy objects have been used and/or are being used with other toy objects, gaming systems, and/or other devices. The system described in this disclosure may be configured to facilitate an association of the information stored on the toy objects with virtual entities in a virtual space, update virtual content associated with the virtual entities, determine relationships between users, and/or other perform other functions based on the information stored on the toy objects. The information stored on the toy objects may be updated responsive to the toy objects being used by users with other toy objects, gaming systems, and/or other devices. The use of the toy objects by users may include two or more users playing together with toy objects and/or playing with gaming systems associated with the toy objects.

10 Claims, 6 Drawing Sheets

(56) References Cited

U.S. PATENT DOCUMENTS

| | | | |
|---|---|---|---|
| 9,011,194 B2 | 4/2015 | Colbert | |
| 2002/0077182 A1* | 6/2002 | Swanberg et al. | 463/43 |
| 2004/0087364 A1 | 5/2004 | Ishikawa | 463/29 |
| 2004/0214642 A1 | 10/2004 | Beck | 463/40 |
| 2004/0229696 A1 | 11/2004 | Beck | 463/40 |
| 2005/0153623 A1* | 7/2005 | Shrock et al. | 446/268 |
| 2006/0054679 A1* | 3/2006 | Ruping | 235/375 |
| 2006/0273907 A1 | 12/2006 | Heiman et al. | 340/572.2 |
| 2006/0273909 A1 | 12/2006 | Heiman et al. | 340/572.7 |
| 2007/0066396 A1* | 3/2007 | Weston et al. | 463/39 |
| 2007/0093170 A1 | 4/2007 | Zheng | 446/268 |
| 2007/0093172 A1 | 4/2007 | Zheng | 446/268 |
| 2007/0197297 A1 | 8/2007 | Witchey | 463/42 |
| 2009/0124165 A1* | 5/2009 | Weston | 446/268 |
| 2010/0274902 A1 | 10/2010 | Penman et al. | 709/227 |
| 2011/0291953 A1 | 12/2011 | Cheok et al. | 345/173 |
| 2014/0273729 A1 | 9/2014 | Colbert | 446/484 |
| 2014/0274405 A1 | 9/2014 | Colbert | |

\* cited by examiner

MANAGING VIRTUAL CONTENT BASED ON INFORMATION ASSOCIATED WITH TOY OBJECTS

FIELD OF THE DISCLOSURE

This disclosure relates to a system configured to manage virtual content within a virtual space based on information associated with toy objects.

BACKGROUND

Gathering information about how consumers use toys both to enrich the experience of the consumer and/or to develop marketing information is known. Information about how toys are used is typically gathered via a questionnaire and/or lab studies. Conventionally, various aspects of a virtual space may be managed. Such managing, however, may be typically based on a stage or level of completion of gameplay within the virtual space. The availability of specific user characters and/or non-user characters may generally also be dependent on a stage or level of completion of gameplay within the virtual space. Video gaming systems configured to update game information responsive to detecting a physical game piece in/on a reader are known. However, such information is typically related to previous electronic video game play.

SUMMARY

One aspect of the disclosure relates to a system configured to manage virtual content within a virtual space. The system may comprise a first toy object, a reader, and/or other components. The first toy object may be a standalone physical object. The first toy object may be associated with a first virtual entity in the virtual space. The first toy object may comprise a transponder, a power source, electronic storage, and/or other components. The transponder may be configured to receive play information from toy objects used with the first toy object during physical play in the real world. The play information may indicate which toy objects are used with the first toy object during play such that the transponder receives play information from a second toy object responsive to the second toy object being used with the first toy object during physical play in the real world. The power source may be configured to portably power the transponder and/or other components of the first toy object. The electronic storage may be configured to electronically store the play information. The reader may be configured to detect the first toy object responsive to the first toy object being in proximity to the reader. The reader may be configured to read the information stored on the first toy object including the play information received from the toy objects used with the first toy object during physical play in the real world. The reader may be configured to convey the information read from the first toy object to a gaming system to facilitate an association of content corresponding to the information read from the first toy object with the first virtual entity in the virtual space.

Another aspect of the present disclosure relates to a method for managing virtual content within a virtual space. The method may comprise receiving play information with a transponder of a first toy object from toy objects used with the first toy object during physical play in the real world. The first toy object may be a standalone physical object. The play information may indicate which toy objects are used with the first toy object during play such that play information is received from a second toy object responsive to the second toy object being used with the first toy object during physical play in the real world. The method may comprise portably powering the transponder of the first toy object; electronically storing the play information in electronic storage of the first toy object; detecting the first toy object responsive to the first toy object being in proximity to a reader; reading the information stored on the first toy object including the play information received from the toy objects used with the first toy object during physical play in the real world; and conveying the information read from the first toy object to a gaming system to facilitate an association of content corresponding to the information read from the first toy object with a first virtual entity in the virtual space. The first virtual entity may be associated with the first toy object.

Yet another aspect of the present disclosure relates to a system configured to update information related to entities in a virtual space associated with toy objects. The updating may be based on play information that indicates gaming systems that have been used with the toy objects. The system may include one or more processors. The processors may be configured to execute computer program modules. The computer program modules may comprise a communication module, an update module, and/or other modules. The communication module may be configured to, responsive to toy objects being detected by readers associated with gaming systems, receive play information indicating which gaming systems have been used with the toy objects. The toy objects may be standalone physical objects. The toy objects may be associated with entities in the virtual space. The toy objects may include a first toy object associated with a first entity. The gaming systems may include a first gaming system and a second gaming system. The communication module may be configured such that, responsive to the first toy object being used with the second gaming system and then being detected by a reader associated with the first gaming system, the communication module receives first play information indicating that the first toy object has been used with the second gaming system. The update module may be configured to, responsive to the communication module receiving the play information, update information related to the associated entities in the virtual space. The updating may be based on the play information, such that responsive to reception of the first play information, the information associated with the first entity is updated in the virtual space.

Yet another aspect of the present disclosure relates to a method for managing virtual content within a virtual space wherein the method includes receiving play information indicating gaming systems that have been used with toy objects and updating information related to associated entities in the virtual space based on the play information. The method may comprise receiving play information indicating gaming systems that have been used with toy objects responsive to the toy objects being detected by readers associated with the gaming systems. The toy objects may be standalone physical objects. The toy objects may be associated with entities in the virtual space. The toy objects may include a first toy object associated with a first entity. The gaming systems may include a first gaming system and a second gaming system. For example, responsive to the first toy object being used with the second gaming system and then being detected by a reader associated with the first gaming system, first play information indicating that the first toy object has been used with the second gaming system may be received. The method may comprise updating information related to the associated entities in the virtual space based on the play information responsive to receiving the play information, such that, responsive to reception of the first play information, the information associated with the first entity is updated in the virtual space.

Yet another aspect of the present disclosure relates to a system configured to determine relationships between users. The system may comprise one or more processors configured to execute computer program modules. The computer program modules may comprise a user module, a relationship module, and/or other modules. The user module may be configured to maintain user accounts associated with individual users in a virtual space. The user accounts may include information related to toy objects associated with the users, information related to gaming systems associated with the users, and/or other information. The toy objects may be standalone physical objects. The gaming systems may be associated with readers configured to detect the toy objects. The user accounts may include a first user account associated with a first user and a second user account associated with a second user. The first user account may include information related to a first toy object and a first gaming system. The second user account may include information associated with a second toy object and a second gaming system. The relationship module may be configured to determine relationships between the users based on use of the toy objects with different gaming systems. Responsive to one or more of the first toy object being detected by a reader associated with the second gaming system, or the second toy object being detected by a reader associated with the first gaming system, the relationship module may determine a first relationship between the first user and the second user.

Yet another aspect of the present disclosure relates to a method for determining relationships between users. The method may comprise maintaining user accounts associated with individual users in a virtual space. The user accounts may include information related to toy objects associated with the users, information related to gaming systems associated with the users, and/or other information. The toy objects may be standalone physical objects. The gaming systems may be associated with readers configured to detect the toy objects. The user accounts may include a first user account associated with a first user and a second user account associated with a second user. The first user account may include information related to a first toy object and a first gaming system. The second user account may include information associated with a second toy object and a second gaming system. The method may comprise determining relationships between the users based on use of the toy objects with different gaming systems. For example, responsive to one or more of the first toy object being detected by a reader associated with the second gaming system, or the second toy object being detected by a reader associated with the first gaming system, a first relationship between the first user and the second user may be determined.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The system described in this disclosure may be configured to read information stored on toy objects that indicates whether the toy objects have been used and/or are being used with other toy objects, gaming systems, and/or other devices. The system described in this disclosure may be configured to facilitate an association of the information stored on the toy objects with virtual entities in a virtual space, update virtual content associated with the virtual entities, determine relationships between users, and/or perform other functions based on the information stored on the toy objects. The information stored on the toy objects may be updated responsive to the toy objects being used by users with other toy objects, gaming systems, and/or other devices. The use of the toy objects by users may include two or more users playing together with toy objects, playing with gaming systems associated with the toy objects, and/or other use. In some implementations, the system may facilitate enhancing a customer retail experience at a retail store (e.g., an online store), direct marketing opportunities, and/or other activities based on the information from the system.

Figure 1:
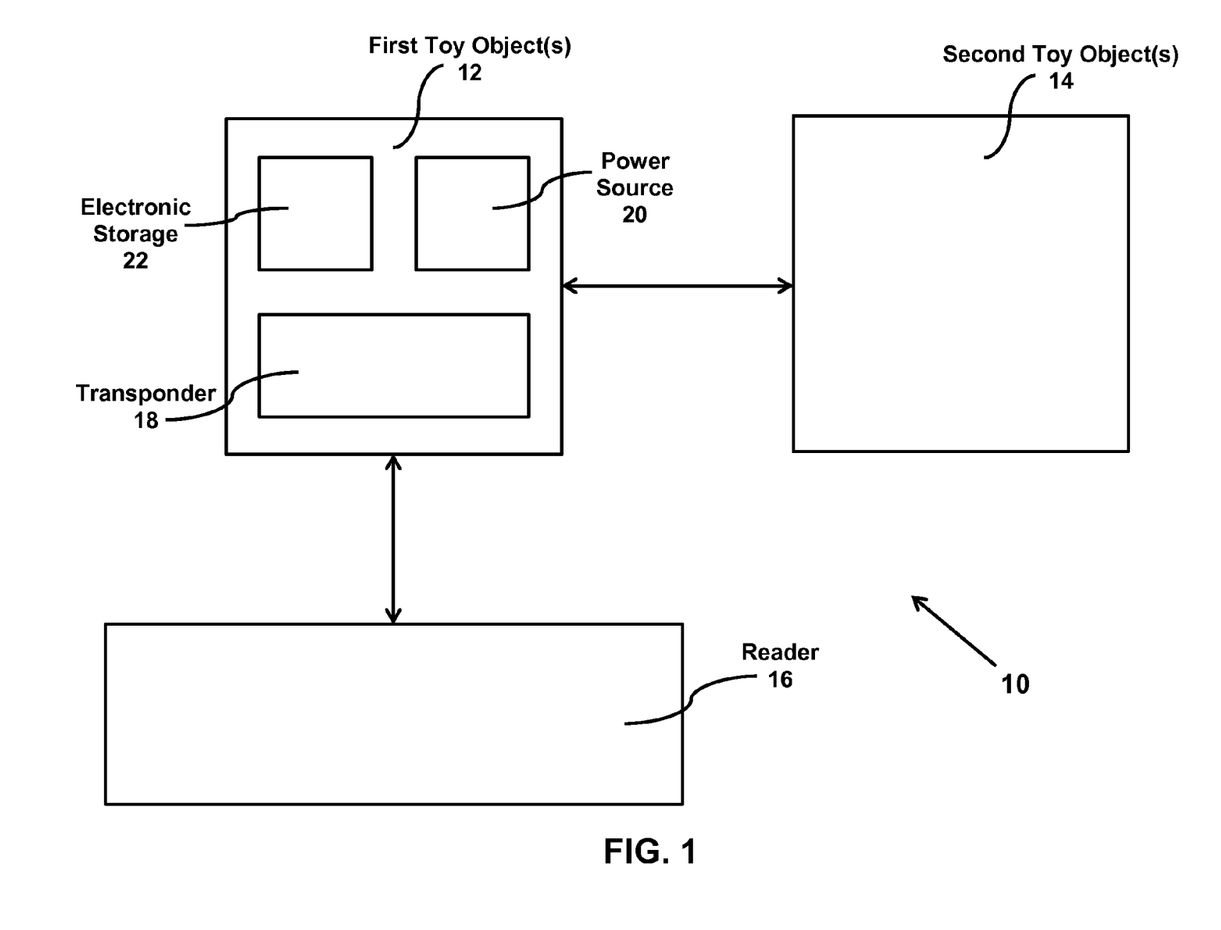
FIG. 1 illustrates a system configured to manage virtual content within a virtual space based on information associated with toy objects.

FIG. 1 illustrates a system 10 configured to manage virtual content within a virtual space. In some implementations, system 10 may be configured to facilitate an association of content stored on toy objects with virtual entities in the virtual space. In some implementations, system 10 may comprise one or more first toy objects 12, a reader 16, and/or other components. FIG. 1 illustrates first toy objects 12 communicating with second toy objects 14. Second toy objects 14 may include toy objects used with first toy objects 14 during physical play in the real world.

First toy object 12 may be a standalone physical object. First toy object 12 may be associated with a first virtual entity in the virtual space. The first virtual entity may comprise one or more of a virtual game, a virtual character, a power, an ability and/or skill that can be applied to the virtual character, a virtual object, simulated physical phenomena, and/or other virtual content. First toy object 12 may be configured to be detectable by reader 16. In some implementations, first toy object 12 may be configured to depict a given character (e.g., Mickey Mouse). First toy object 12 may be a toy figurine embodying the appearance of the given character. The toy figurine may be configured to be detected by reader 16. The description of the form factor of first toy object 12 is not intended to be limiting. First toy object 12 may have any form factor (e.g., a coin, a lanyard, a key, an identification card) provided it functions as described herein. In some implementations, first toy object 12 may include a transponder 18, a power source 20, electronic storage 22, and/or other components.

In some implementations, first toy object 12 may be configured to provide feedback to users during physical play in the real world. First toy object 12 may include feedback devices configured to provide the feedback to the user. The feedback may include one or more of a mechanical motion, an audible sound, a visual display, and/or other feedback. The feedback devices may be powered by power source 20, for example. In some implementations, the feedback devices may be controlled by one or more processors included in first toy object 12, for example. The feedback may be responsive to using first toy object 12 with other toy objects, gaming systems, and/or other devices.

Transponder 18 may be configured to receive play information from toy objects (e.g., second toy object 14) used with the first toy object during physical play in the real world. The play information may indicate which toy objects are used with the first toy object during play. In some implementations, the play information may include identification information identifying the toy objects used with first toy object 12 during physical play in the real world. For example, transponder 18 may receive play information from second toy object 14 responsive to second toy object 14 being used with first toy object 12 during physical play in the real world. In some implementations, transponder 18 may be configured such that the play information includes information related to toy objects currently and/or previously used with the first toy object during physical play in the real world. In some implementations, the play information may include information related to a geo-location of first toy object 12 during play. In some implementations, for example, transponder 18 may include a radio-frequency identification (RFID) device configured to emit radio-frequency electromagnetic fields responsive to first toy object 12 being disposed in proximity to second toy object 14. In some implementations, the toy objects used with the first toy object during physical play in the real world may include two distinct toy objects that appear to be the same (e.g., two Mickey Mouse toy objects that may or may not be associated with a single user).

In some implementations, second toy object 14 may be a non-powered toy object. For example, second toy object may be one or more toy accessories associated with first toy object 12 and/or other non-powered toy objects. Toy accessories may include, for example, a weapon, clothing, other character related accessory attachments, a vehicle, a pet, customizations such as attachable hair styles, a physical toy play set (e.g., a dollhouse, a toy castle), representations of virtual customizations (such as pucks that attach to the bottom of a toy), and/or other accessories. The representations of virtual customizations may represent, for example, changes to a character that do not have a physical embodiment such as improved strength (such that users may imagine what the representations of virtual customizations mean in the physical world). In some implementations, second toy object 14 may be a powered toy object similar to first toy object 12. Second toy object 14 may include a second transponder, a second power source, second electronic storage, and/or other components. Second toy object 14 may be associated with a second virtual entity in the virtual space. In some implementations, second toy object 14 (and/or first toy object 12) may be any electronic device with a compatible transponder. For example, second toy object 14 may be a mobile phone. The mobile phone may be configured to display images of a virtual character that it represents.

Power source 20 may be configured to portably supply electrical power to one or more components of system 10. Power source 20 may comprise one or more power sources connected in series and/or in parallel. Power source 20 may be configured to portably power transponder 18. By way of non-limiting example, power source 20 may include one or more of a battery, a capacitor, an apparatus for receiving electrical power from an external source (e.g., a wall socket), an apparatus for receiving solar power, and/or other power supplies. In some implementations, power source 20 may be rechargeable. In some implementations, device 10 may receive power via a USB port and/or other wired communications port that may be part of electronic storage 20. In some implementations, power source 20 may be wirelessly recharged via a non-contact charging circuit, and/or other devices.

Electronic storage 22 may be configured to electronically store the play information. In some implementations, electronic storage 22 may be configured to store an identifier for first toy object 12 that identifies first toy object 12 responsive to first toy object 12 being detected by reader 16. In some implementations, electronic storage 22 may be configured to store information related to the first virtual entity associated with first toy object 12. In some implementations, electronic storage may be configured to store information related to gaming systems used with first toy object 12. In some implementations, electronic storage 22 may comprise electronic storage media that electronically stores information. The electronic storage media of electronic storage 22 may comprise storage that is provided integrally (i.e., substantially non-removable) with first toy object 12. Electronic storage 22 may comprise one or more of optically readable storage media (e.g., optical disks, etc.), magnetically readable storage media (e.g., magnetic tape, magnetic hard drive, etc.), electrical charge-based storage media (e.g., EPROM, RAM, etc.), solid-state storage media (e.g., flash drive, etc.), and/or other electronically readable storage media. Electronic storage 22 may store information that enables system first toy object 12 to function properly. Electronic storage 22 may be (in whole or in part) a separate component within first toy object 12, or electronic storage 22 may be provided (in whole or in part) integrally with one or more other components of first toy object 12 (e.g., transponder 18, power source 20, etc.).

Reader 16 may be configured to detect first toy object 12 responsive to first toy object 12 being in proximity to reader 16. In some implementations, first toy object 12 may be disposed upon reader 16 in order to be detected. In some implementations, a at least a portion of first toy object 12 may abut at least a portion of reader 16 in order to be detected. In some implementations, detection of first toy object 12 may be based on a shape of a portion of first toy object 12. In some implementations, first toy object 12 may be detectable based on a given signal conveying information associated with first toy object 12. Detection of first toy object 12 may be facilitated by electronics embedded (e.g., transponder 18) within or otherwise included in first toy object 12. Similar to the example above, first toy object 12 may include an RFID device configured to emit radio-frequency electromagnetic fields responsive to first toy object 12 being disposed in proximity to reader 16. Reader 16 may be configured to read the information stored on first toy object 12 including the play information received from the toy objects (e.g., second toy object 14) used with first toy object 12 during physical play in the real world. Reader 16 may be configured to convey the information read from first toy object 12 to a gaming system (not shown in FIG. 1) to facilitate an association of content corresponding to the information read from first toy object 12 with the first virtual entity in the virtual space. In some implementations, reader 16 may be configured to read the information related to the first virtual entity and convey the information related to the first virtual entity to the gaming system.

In some implementations, reader 16 may be configured to detect a plurality of individual toy objects (e.g., first toy object 12 and second toy object 14) together. In some implementations, the plurality of individual toy objects may include two distinct toy objects that appear to be the same (e.g., two Mickey Mouse toy objects that may or may not be associated with a single user). Reader 16 may be configured to detect the plurality of toy objects responsive to the toy objects being in proximity to reader 16 at the same time. For example, the plurality of individual toy objects may include first toy object 12 and second toy object 14.

Figure 2:
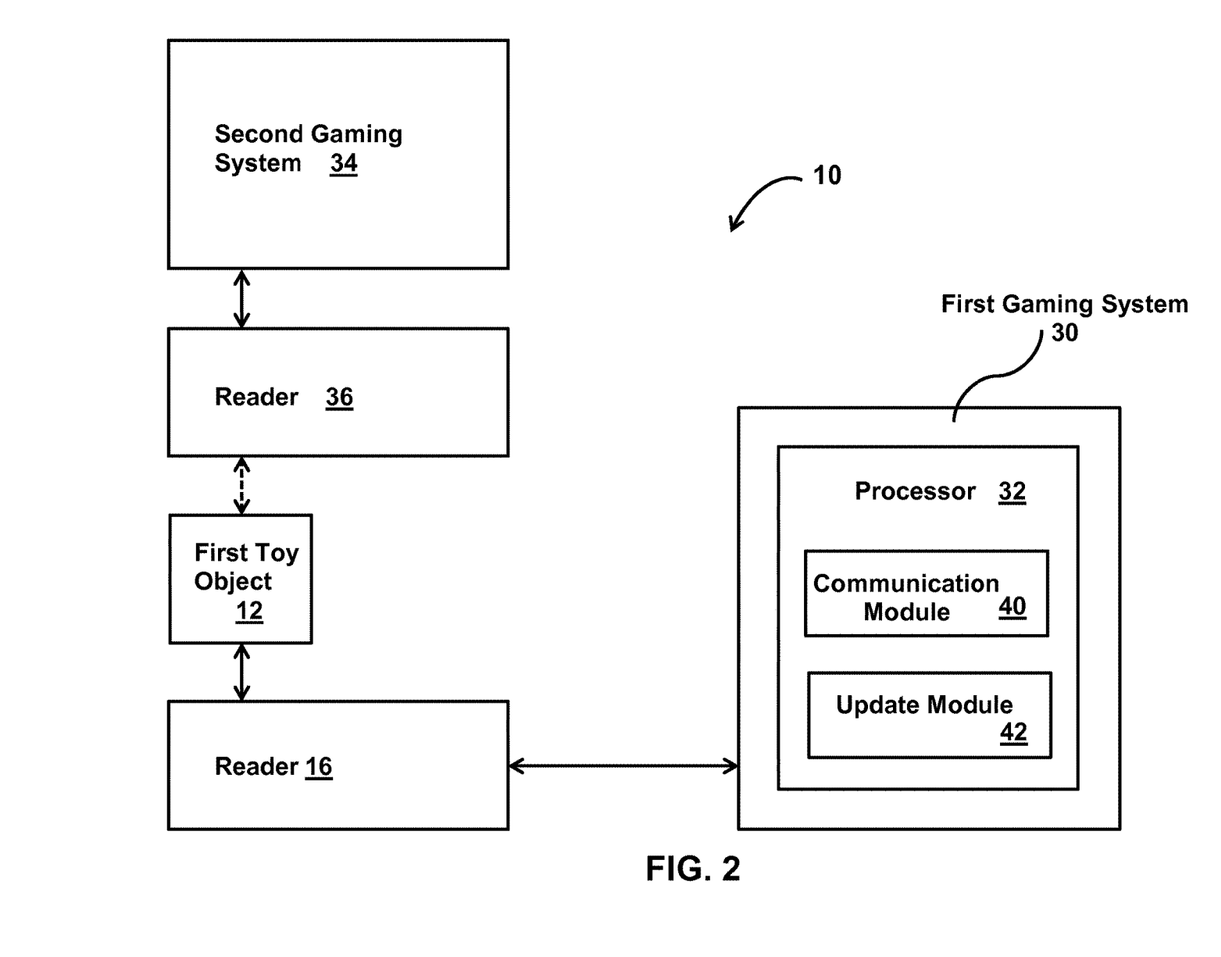
FIG. 2 illustrates an example implementation of the system that is configured to associate and/or update information in the virtual space.

FIG. 2 illustrates an example implementation of system 10 configured to associate and/or update information related to the entities in the virtual space associated with the toy objects based on the play information. The play information may indicate which toy objects have been used together (e.g., as described relative to FIG. 1), gaming systems have been used with the toy objects, and/or other information. The example of system 10 shown in FIG. 2 includes first gaming system 30, second gaming system 34, reader 16, a second reader 36, first toy object 12, and/or other components.

First gaming system 30 and second gaming system 34 may include one or more processors configured to execute computer program modules. The computer program modules may be configured to enable an expert and/or user associated with the given gaming system to interface with system 10, readers 16 and/or 36, and/or other external resources, and/or provide other functionality attributed herein to gaming systems 30 and/or 34. By way of non-limiting example, gaming systems 30 and/or 34 may include one or more of a video game system (e.g., Microsoft Xbox), a desktop computer, a laptop computer, a handheld computer, a NetBook, a Smartphone, and/or other computing platforms. The gaming systems may be associated with the readers. For example, first gaming system 30 may be associated with reader 16 and second gaming system 34 may be associated with reader 36.

The description below focuses on reader 16, first gaming system 30, and processor 32. This is not intended to be limiting. One of ordinary skill in the art would recognize similar functionality for reader 36, second gaming system 34 and a processor included in gaming system 34, and/or other components.

As shown in FIG. 2, processor 32 may be configured to provide information processing capabilities in first gaming system 30. Processor 32 may be configured to execute one or more computer program modules. The computer program modules may comprise one or more of a communication module 40, an update module 42, and/or other modules.

Communication module 40 may be configured to receive information conveyed by reader 16. Communication module 40 may be configured to receive the information responsive to toy objects (e.g., first toy object 12) being detected by reader 16. The information received by communication module 40 may include the play information indicating which gaming systems have been used with the toy objects.

Communication module 40 may be configured such that the information received from reader 16 includes information related to output signals from reader 16. Information related to the output signals of reader 16 may comprise information related to individual ones of the toy objects, a quantity of toy objects, users associated with toy objects, virtual characters associated with toy objects, geographic locations of readers, and/or other information. Communication module 40 may be configured to receive the information conveyed by reader 16 via a wireless and/or wired connection.

Communication module 40 may be configured such that, responsive to first toy object 12 being used with second gaming system 34 and then being detected by reader 16, communication module 40 may receive first play information indicating that first toy object 12 has been used with second gaming system 34, and/or indicating other information. For example, first play information may indicate that first toy object 12 has been used with second toy object 14 as described above. Using first toy object 12 with second gaming system 34 may include first toy object 12 being detected by reader 36, and/or other use.

Responsive to communication module 40 receiving the information conveyed by reader 16, update module 42 may be configured to associate the content corresponding to the information read from first toy object 12 with the first virtual entity in the virtual space. In some implementations, update module 42 may be configured to update the information related to the entities in the virtual space that are associated with the toy objects (e.g., first toy object 12). Update module 42 may be configured to associate and/or update the information responsive to communication module 40 receiving the play information. Update module 42 may be configured to associate and/or update the information related to the entities associated with the toy objects based on the play information.

For example, a user may use first toy object 12 with second toy object 14 (shown in FIG. 1) on second gaming system 34. Play information including information related to first toy object 12, second toy object 14, second gaming system 34, and/or other information may be stored on first toy object 12 (e.g., via transponder 18 and/or electronic storage 22 shown in FIG. 1). First toy object 12 may then be placed on reader 16. Responsive to reception of the play information from first toy object 12 via reader 16 by communication module 40, update module 42 may associate the first virtual entity associated with first toy object 12 and the second virtual entity associated with second toy object 14 (shown in FIG. 1). The information associated with the first entity may be updated to reflect that first toy object 12 was used with second gaming system 34.

In some implementations, update module 42 may be configured such that the information associated with the entities in the virtual space is updated such that additional content associated with the entities in the virtual space is unlocked. The additional content associated with the entities in the virtual space may comprise one or more of skills, languages, powers, quests, pets, levels, rides, weapons, characters, mini-games, movie previews, virtual goods, scenes, terrain pieces, vehicles, shape changing ability, and/or other content. Changing shapes may be an ability available to be updated and/or unlocked for an entity in the virtual space. For example, an entity may gain the ability to transform, and/or may be simply transformed responsive to the information associated with the first entity being updated and/or unlocked. The shape change may include character customization type changes (e.g., hair color, eye color, clothing, height, weight, strength), and/or it could include complete changes to the appearance of the character. For example, the character may change (and/or be able to change) from a human to a wolf, a pig, and/or other characters. The character may change to dark Spiderman instead of normal Spiderman, for example.

In some implementations, update module 42 may be configured such that the unlocked additional content is determined based on play criteria associated with the toy objects. The unlocking of the additional content may be responsive to the play criteria being met. Update module 42 may be configured to determine whether the play criteria has been met based on the play information, and/or other information. In some implementations, the play criteria may include criteria related to one or more of a quantity of gaming systems used with the toy objects, geo-locations of gaming systems, owners of gaming systems, a quantity of toy objects used with a given toy object, a kind and/or variety of toy objects used with a given toy object, owners of the toy objects, a quantity of toy objects used with the given toy object owned by a single individual owner, interactions with non-toy object and/or gaming systems (e.g., kiosks at themeparks, etc.), poses a toy object is placed in, and/or other criteria. For example, first toy object 12 may be used with five different gaming systems before being placed on reader 16. Update module 42 may unlock a team game in the virtual space where the members of the team are associated with owners of the five different gaming systems.

In some implementations, update module 42 may be configured to update information associated with multiple entities in the virtual space based on detection of a plurality of individual toy objects currently and/or previously together at an individual reader, based on use of an individual toy object with multiple other toy objects, use of an individual toy object with multiple gaming systems, and/or based on other information. For example, the information associated with the first entity may be updated in the virtual space based on detection of first toy object 12 currently being used with second toy object 14 by reader 16.

Figure 3:
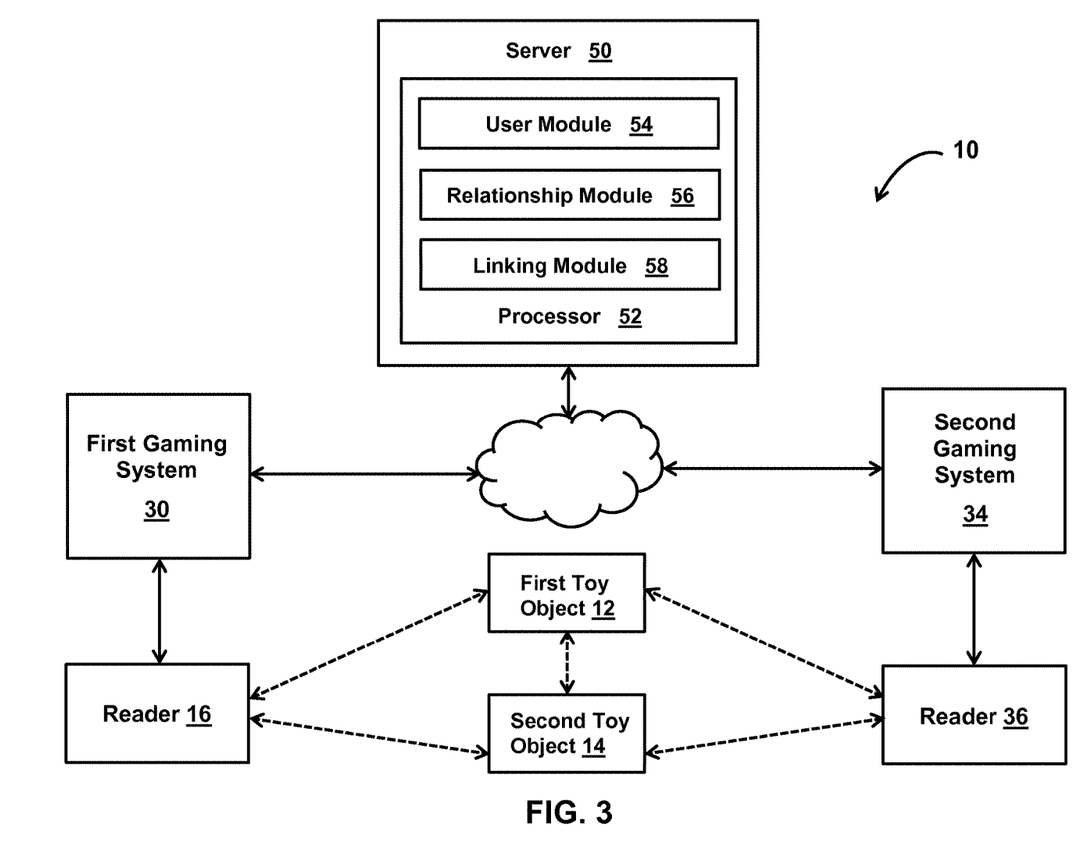
FIG. 3 illustrates an example implementation of the system that is configured to determine relationships between users.

FIG. 3 illustrates an example implementation of system 10 that is configured to determine relationships between users. The implementation of system 10 shown in FIG. 3 includes first toy object 12, second toy object 14, reader 16 and first gaming system 30, reader 36 and second gaming system 34, a server 50, and/or other components. Server 50 may comprise a processor 52, and/or other components.

In some implementations, server 50 may include communication lines, or ports to enable the exchange of information with a network, gaming systems (e.g., first gaming system 30 and/or second gaming system 34), and/or other computing platforms. Server 50 may include a plurality of hardware, software, and/or firmware components operating together to provide the functionality attributed herein to server 50. For example, server 50 may be implemented by a cloud of computing platforms operating together as a system server.

As shown in FIG. 3, processor 52 may be configured to execute one or more computer program modules. The computer program modules may comprise one or more of a user module 50, a relationship module 56, a linking module 58, and/or other modules.

User module 54 may be configured to maintain user accounts associated with individual users in the virtual space. The user accounts may include information related to the entities in the virtual space associated with the toy objects and/or the users, information related to toy objects (e.g., first toy object 12, second toy object 14) associated with the users, information related to gaming systems (e.g., first gaming system 30, second gaming system 34), information related to an electronic social network associated with the users, and/or other information. For example, the user accounts may include a first user account associated with a first user and a second user account associated with a second user. The first user account may include information related to the first entity, first toy object 12 (and/or other toy objects associated with the first user), first gaming system 30, and/or other information. The second user account may include information related to the second entity, second toy object 14 (and/or other toy objects associated with the second user), second gaming system 34, and/or other information. The user module may be configured such that the information in the user accounts is stored electronically on server 50 and/or in other locations.

Relationship module 56 may be configured to determine relationships between the users based on use of toy objects with different toy objects and/or gaming systems, based on the information in the user accounts, and/or based on other information. Determining relationships between the users may include associating individual user accounts with each other. For example, responsive to first toy object 12 being detected by reader 36 associated with second gaming system 34, and/or second toy object 14 being detected by reader 16 associated with first gaming system 30, relationship module 56 may determine a relationship between the first user and the second user. Relationship module 56 may associate the first user account with the second user account. As another example, first toy object 12 may be used with second toy object 14 during physical play in the real world. Responsive to first toy object being detected by reader 16 and/or second toy object 14 being detected by reader 36 after play, relationship module 56 may determine a relationship between the first user and the second user.

In some implementations, relationship module 56 may be configured such that relationships between users are determined based on the play criteria associated with the toy objects. The relationship determinations may be responsive to the play criteria being met. In some implementations, relationship module 56 may be configured to determine relationships between the users based on a quantity of gaming systems used with the toy objects, geo-locations of gaming systems, owners of gaming systems, a quantity of toy objects used with a given toy object, a kind and/or variety of toy objects used with a given toy object, owners of the toy objects, a quantity of toy objects used with the given toy object owned by a single individual owner, and/or other criteria.

In some implementations, linking module 58 may be configured to link information related to the toy objects, the users, the gaming systems, the virtual space, and/or other information. The linking may be responsive to relationship determinations by relationship module 56. Linking information may include, for example, establishing electronic relationships between entities in the virtual space, recommending social network relationships between users, generating marketing information, and/or other activities.

In some implementations, linking module 58 may be configured to establish electronic relationships between entities in the virtual space based on the relationship determinations. For example, responsive to the determination of the relationship between the first user and the second user, a first electronic relationship between the first entity in the virtual space associated with the first user and the second entity in the virtual space associated with the second user may be established.

In some implementations, linking module 58 may be configured to recommend electronic social network links between users based on the relationship determinations. For example, responsive to the determination of the relationship between the first user and the second user, a first electronic social network link between the first user and the second user may be recommended to the first user and/or to the second user.

In some implementations, linking module 58 may be configured to generate marketing information for the users based on the relationship determinations. Responsive to the determination of the relationship between the first user and the second user, a first marketing recommendation may be generated for the first user that conveys information related to toy objects associated with the second user. A second marketing recommendation may be generated for the second user that conveys information related to toy objects associated with the first user. For example, two friends may play with each other's toy objects, accessories, and/or other toys. Responsive to relationship module 56 determining a relationship between the two friends, linking module 58 may generate an advertisement to be sent to the first friend that advertises toys played with but not owned by the first friend. As another example, linking module 58 may be configured to generate a marketing recommendation related to organizing an online store with merchandise related to the toy objects played with but not owned by the users.

As shown in FIG. 2 and FIG. 3, processors 32 and/or 52 are configured to provide information processing capabilities in system 10. As such, processors 32 and/or 52 may comprise one or more of a digital processor, an analog processor, a digital circuit designed to process information, an analog circuit designed to process information, a state machine, and/or other mechanisms for electronically processing information. Although processors 32 and/or 52 are shown in FIG. 2 and FIG. 3 as single entities, this is for illustrative purposes only. In some implementations, processors 32 and/or 52 may each comprise a plurality of processing units. These processing units may be physically located within the same device (e.g., server 50), or processors 32 and/or 52 may represent processing functionality of a plurality of devices operating in coordination.

Processors 32 and/or 52 may be configured to execute their associated modules, and/or other modules by software; hardware; firmware; some combination of software, hardware, and/or firmware; and/or other mechanisms for configuring processing capabilities on processors 32 and/or 52.

It should be appreciated that although the sets of modules (40-42 and 54-58) are illustrated in FIG. 2 and FIG. 3 as being co-located within single processing units 32 and/or 52, in implementations in which processors 32 and/or 52 comprise multiple processing units, one or more of the modules in a set of modules may be located remotely from the other modules in the set. The description herein of the functionality provided by the different modules is for illustrative purposes, and is not intended to be limiting, as any of the modules may provide more or less functionality than is described. For example, one or more of the modules may be eliminated, and some or all of its functionality may be provided by other modules. As another example, processor 52 (FIG. 3) may be configured to execute one or more additional modules that may perform some or all of the functionality attributed below to one of modules 40 and/or 42.

Figure 4:
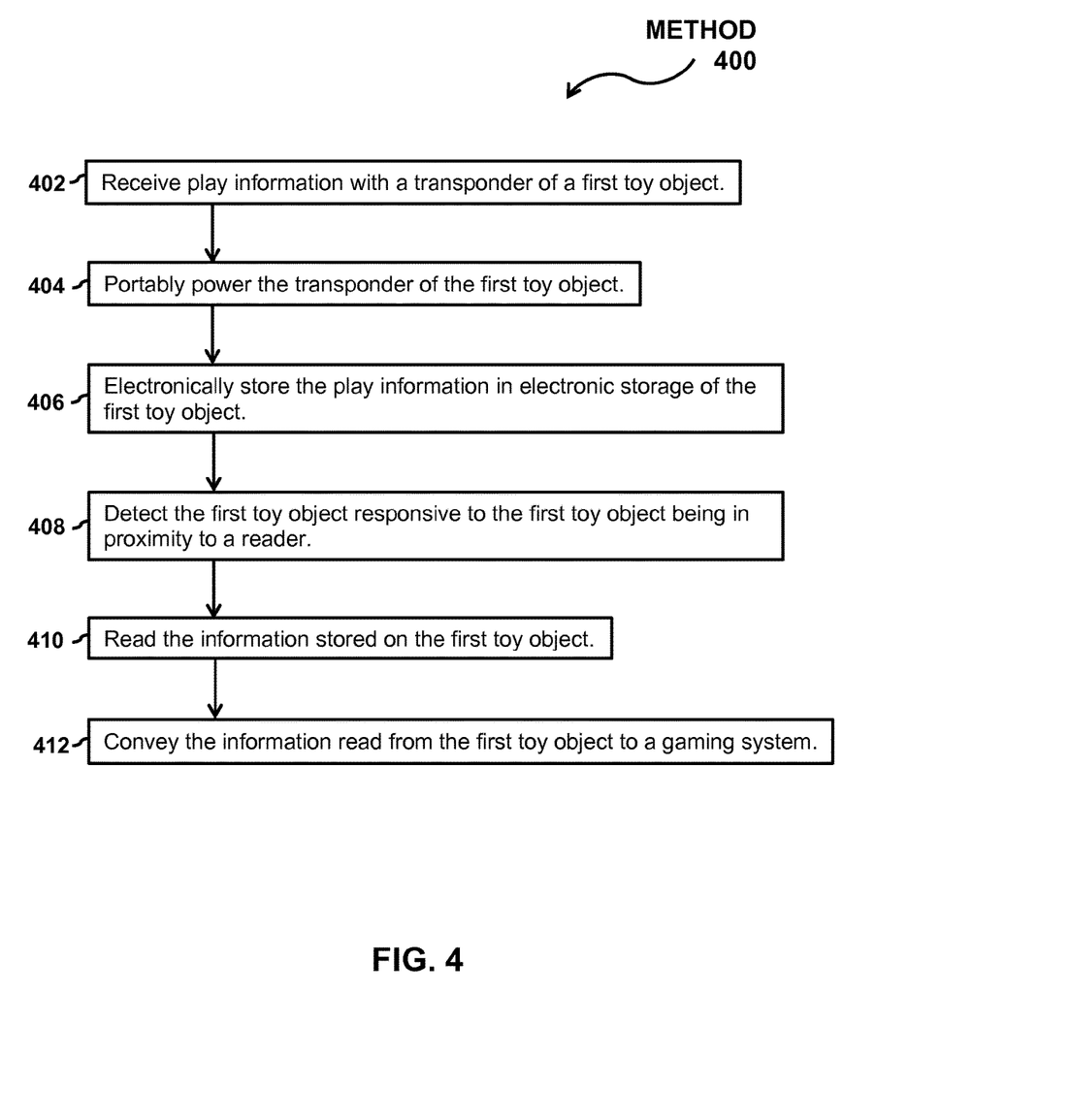
FIG. 4 illustrates a method for managing virtual content within a virtual space based on information associated with toy objects.
Figure 5:
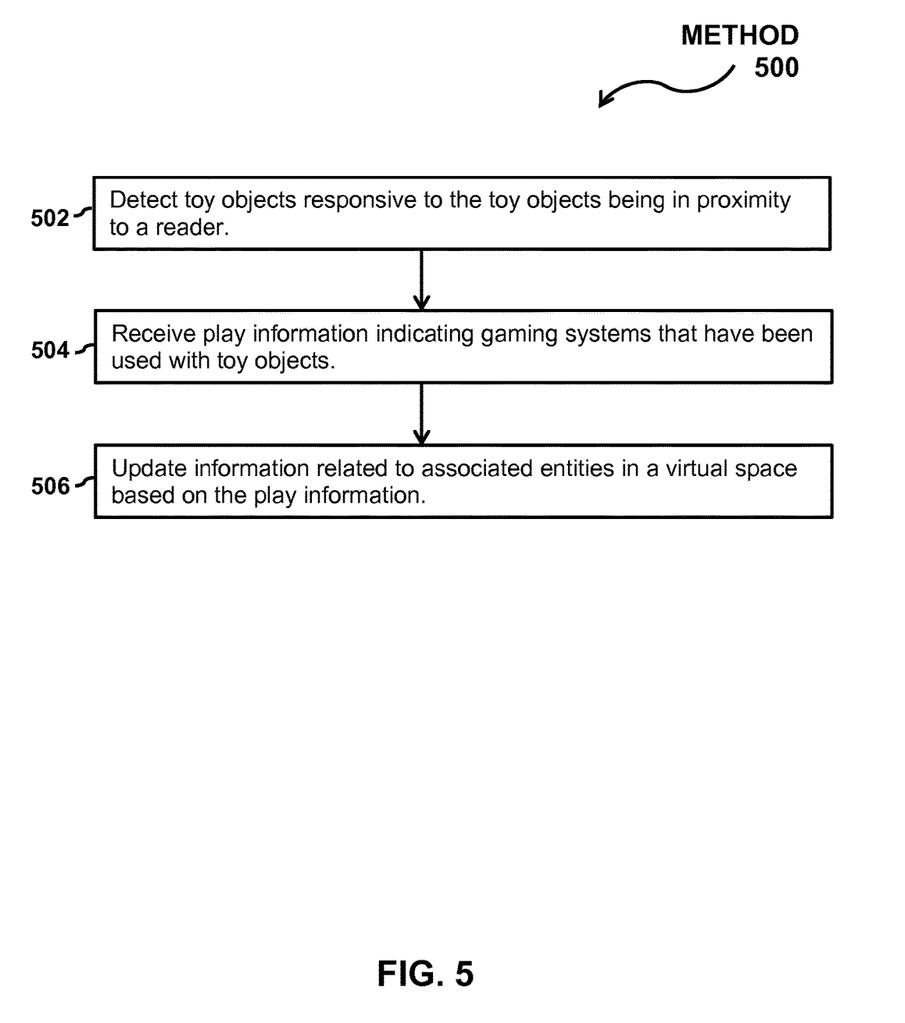
FIG. 5 illustrates a method for associating and/or updating information in the virtual space.
Figure 6:
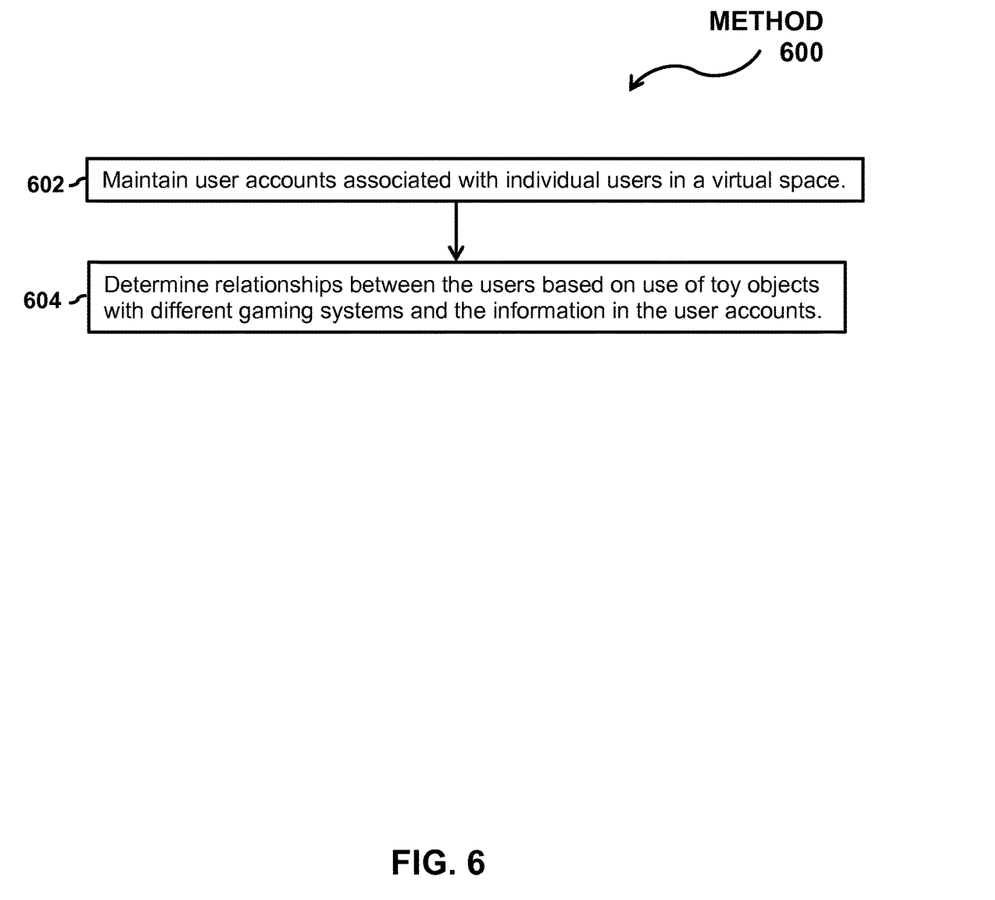
FIG. 6 illustrates a method for determining relationships between users.

FIG. 4, FIG. 5, and FIG. 6 illustrate methods 400, 500, and 600. The operations of methods 400, 500, and/or 600 presented below are intended to be illustrative. In some implementations, methods 400, 500, and/or 600 may be accomplished with one or more additional operations not described, and/or without one or more of the operations discussed. Additionally, the order in which the individual operations of methods 400, 500, and 600 are illustrated in FIG. 4, FIG. 5, and FIG. 6 respectively, and described below is not intended to be limiting.

In some implementations, methods 400, 500, and/or 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 400, 500, and/or 600 in response to instructions stored electronically on an electronic storage medium. The one or more processing devices may include one or more devices configured through hardware, firmware, and/or software to be specifically designed for execution of one or more of the operations of methods 400, 500, and/or 600.

Referring to FIG. 4 and method 400, at an operation 402, play information may be received with a transponder of a first toy object. The play information may be received from toy objects used with the first toy object during physical play in the real world. The first toy object may be a standalone physical object. The play information may indicate which toy objects are used with the first toy object during play. For example, play information may be received from a second toy object responsive to the second toy object being used with the first toy object during physical play in the real world. In some implementations, the play information may include identification information identifying the toy objects used with the first toy object during physical play in the real world. In some implementations, the play information may include information related to toy objects currently and/or previously used with the first toy object during physical play in the real world. Operation 402 may be performed by a transponder that is the same as or similar to transponder 18 of first toy object 12 (shown in FIG. 1 and described herein).

At an operation 404, the transponder of the first toy object may be portably powered. In some implementations a transponder of the second toy object may be portably powered. In some implementations, the second toy object may not be powered. Operation 404 (powering the transponder of the first toy object) may be performed by a power source the same as or similar to power source 20 (shown in FIG. 1 and described herein).

At an operation 406, the play information may be electronically stored in electronic storage of the first toy object. Operation 406 may be performed by electronic storage the same as or similar to electronic storage 22 (shown in FIG. 1 and described herein).

At an operation 408, the first toy object may be detected responsive to the first toy object being in proximity to a reader. In some implementations, the electronic storage of the first toy object may be configured to store an identifier for the first toy object that identifies the first toy object responsive to the first toy object being detected. Operation 408 may be performed by a reader the same as or similar to reader 16 (shown in FIG. 1 and described herein).

At an operation 410, the information stored on the first toy object may be read. Reading the information stored on the first toy object may include reading the play information received from the toy objects used with the first toy object during physical play in the real world. Operation 410 may be performed by a reader the same as or similar to reader 16 (shown in FIG. 1 and described herein).

At an operation 412, the information read from the first toy object may be conveyed to a gaming system. Conveying the information read from the first toy object to the gaming system may facilitate an association of content corresponding to the information read from the first toy object with a first virtual entity in the virtual space. The first virtual entity in the virtual space may be associated with the first toy object. Operation 412 may be performed by a reader that is the same as or similar to reader 16 (shown in FIG. 1 and described herein).

In some implementations, method 400 may include storing information related to the first virtual entity associated with the first toy object in the electronic storage of the first toy object (e.g., electronic storage 22 shown in FIG. 1 and described herein), reading the information related to the first virtual entity (e.g., with reader 16 shown in FIG. 1 and described herein), and conveying the information related to the first virtual entity to the gaming system to facilitate the association of the content corresponding to the information read from the first toy object with the first virtual entity in the virtual space (e.g., with reader 16 shown in FIG. 1 and described herein).

Referring to FIG. 5 and method 500, at an operation 502, the toy objects may be detected responsive to the toy objects being in proximity to a reader. Operation 502 may be performed by a reader that is the same as or similar to reader 16 (shown in FIG. 2 and described herein).

At an operation 504, play information indicating gaming systems that have been used with the toy objects may be received. Receiving the play information indicating gaming systems that have been used with toy objects may be responsive to the toy objects being detected by readers associated with the gaming systems. The toy objects may be standalone physical objects. The toy objects may be associated with entities in the virtual space. The toy objects may include a first toy object associated with a first entity. The gaming systems may include a first gaming system and a second gaming system. Responsive to the first toy object being used with the second gaming system and then being detected by a reader associated with the first gaming system, first play information indicating that the first toy object has been used with the second gaming system may be received. Operation 504 may be performed by a computer program module the same as or similar to communication module 40 (shown in FIG. 2 and described herein).

At an operation 506, information related to entities in a virtual space that are associated with the toy objects may be updated based on the received play information. Updating the information related to the associated entities in the virtual space may be responsive to receiving the play information. For example, responsive to reception of the first play information, the information associated with the first entity may be updated in the virtual space. In some implementations, the information associated with the entities in the virtual space may be updated such that additional content associated with the entities in the virtual space is unlocked. The unlocked additional content may be determined based on play criteria associated with the toy objects. The unlocking of the additional content may be responsive to the play criteria being met. The determination of whether the play criteria have been met may be based on the play information. In some implementations, the play criteria may include criteria related to one or more of a quantity of gaming systems used with the toy objects, geo-locations of gaming systems, owners of gaming systems, and/or other information. Operation 506 may be performed by a computer program module that is the same as or similar to update module 42 (shown in FIG. 2 and described herein).

Referring to FIG. 6 and method 600, at an operation 602, user accounts associated with individual users in a virtual space may be maintained. The user accounts may include information related to toy objects associated with the users, information related to gaming systems associated with the users, and/or other information. In some implementations, the user accounts may include information related to entities in the virtual space associated with the users and/or information related to an electronic social network associated with the users. The toy objects may be standalone physical objects. The gaming systems may be associated with readers configured to detect the toy objects. The user accounts may include a first user account associated with a first user and a second user account associated with a second user. The first user account may include information related to a first toy object and a first gaming system. The second user account including information associated with a second toy object and a second gaming system. Operation 602 may be performed by a computer program module that is the same as or similar to user module 54 (shown in FIG. 3 and described herein).

At an operation 604, relationships between users may be determined. The relationships may be determined based on use of the toy objects with different gaming systems, based on the information in the user accounts, and/or based on other information. For example, responsive to one or more of the first toy object being detected by a reader associated with the second gaming system, or the second toy object being detected by a reader associated with the first gaming system, the relationship module may determine a first relationship between the first user and the second user. Operation 604 may be performed by a computer program module that is the same as or similar to interface module 306 (shown in FIG. 3 and described herein).

In some implementations, method 600 may include establishing electronic relationships between entities in the virtual space based on the relationship determinations such that, responsive to the determination of the first relationship between the first user and the second user, a first electronic relationship between a first entity in the virtual space associated with the first user and a second entity in the virtual space associated with the second user is established. In some implementations, method 600 may include recommending electronic social network links between users based on the relationship determinations such that, responsive to the determination of the first relationship between the first user and the second user, a first electronic social network link between the first user and the second user is recommended. In some implementations, method 600 may include generating marketing recommendations for the users based on the relationship determinations such that, responsive to the determination of the first relationship between the first user and the second user, a first marketing recommendation is generated for the first user that conveys information related to toy objects associated with the second user, and a second marketing recommendation is generated for the second user that conveys information related to toy objects associated with the first user.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage virtual content within a virtual space, the system comprising:
one or more hardware processors configured by computer readable instructions to:
receive first play information from a first toy object responsive to the first toy object being detected by a first reader associated with a first gaming platform, the first toy object being associated with a first virtual entity in the virtual space, the first play information being stored to first non-transitory electronic storage of the first toy object prior to detection by the first reader and outside a presence of the first reader, the first play information indicating which toy objects have been in proximity to the first toy object during physical play in the real world prior to detection by the first reader and outside the presence of the first reader, such that:
the first play information indicates a second toy object based on the second toy object having been in proximity to the first toy object during physical play in the real world prior to detection by the first reader and outside the presence of the first reader, the first toy object and second toy object being standalone physical objects;
receive second play information from a second toy object responsive to the second toy object being detected by a second reader associated with a second gaming platform, the second toy object being associated with a second virtual entity in the virtual space, the second play information being stored to second non-transitory electronic storage of the second toy object prior to detection by the second reader and outside a presence of the second reader, the second play information indicating which toy objects have been in proximity to the second toy object during physical play in the real world prior to detection by the second reader and outside the presence of the second reader, such that:
the second play information indicates the first toy object based on the first toy object having been in proximity to the second toy object during physical play in the real world prior to detection by the second reader and outside the presence of the second reader;
store first virtual entity information related to the first virtual entity in the virtual space and update the first virtual entity information based on the first play information, such that responsive to reception of the first play information, the first virtual entity information is updated based on the first play information; and
store second virtual entity information related to the second virtual entity in the virtual space and update the second virtual entity information based on the second play information, such that responsive to reception of the second play information, the second virtual entity information is updated based on the second play information.

2. The system of claim 1, wherein the one or more hardware processors are further configured such that updating the first virtual entity information related to the first virtual entity in the virtual space comprises unlocking content related to the first virtual entity in the virtual space.

3. The system of claim 2, wherein the one or more hardware processors are further configured such that the unlocked content comprises one or more of skills, languages, powers, quests, pets, levels, rides, weapons, characters, mini-games, movie previews, virtual goods, or scenes.

4. The system of claim 2, wherein the one or more hardware processors are further configured such that the unlocked content is determined based on play criteria associated with the first toy object, the unlocking of the content being responsive to the play criteria being met, the one or more hardware processors being further configured to determine whether the play criteria has been met based on the first play information.

5. The system of claim 4, wherein the one or more hardware processors are further configured such that play criteria include criteria related to one or more of a quantity of gaming platforms used with the first toy object, geolocations of gaming platforms, or owners of gaming platforms.

6. The system of claim 1, wherein the first reader associated with the first gaming platform is configured to detect the first toy object responsive to the first toy object being in proximity to the first reader.

7. A method for managing virtual content within a virtual space, the method being implemented in a computer system comprising one or more physical processors and non-transitory electronic storage storing machine-readable instructions, the method comprising:
receiving first play information from a first toy object responsive to the first toy object being detected by a first reader associated with a first gaming platform, the first toy object being associated with a first virtual entity in the virtual space, the first play information being stored to first non-transitory electronic storage of the first toy object prior to detection by the first reader and outside a presence of the first reader, the first play information indicating which toy objects have been in proximity to the first toy object during physical play in the real world prior to detection by the first reader and outside the presence of the first reader, such that:
the first play information indicates a second toy object based on the second toy object having been in proximity to the first toy object during physical play in the real world prior to detection by the first reader and outside the presence of the first reader, the first toy object and second toy object being standalone physical objects;
receiving second play information from a second toy object responsive to the second toy object being detected by a second reader associated with a second gaming platform, the second toy object being associated with a second virtual entity in the virtual space, the second play information being stored to second non-transitory electronic storage of the second toy object prior to detection by the second reader and outside a presence of the second reader, the second play information indicating which toy objects have been in proximity to the second toy object during physical play in the real world prior to detection by the second reader and outside the presence of the second reader, such that:
the second play information indicates the first toy object based on the first toy object having been in proximity to the second toy object during physical play in the real world prior to detection by the second reader and outside the presence of the second reader;

storing first virtual entity information related to the first virtual entity in the virtual space and updating the first virtual entity information based on the first play information, including responsive to reception of the first play information, updating the first virtual entity information based on the first play information; and storing second virtual entity information related to the second virtual entity in the virtual space and updating the second virtual entity information based on the second play information, including responsive to reception of the second play information, updating the second virtual entity information based on the second play information.

8. The method of claim 7, wherein updating the first virtual entity information related to the first virtual entity in the virtual space comprise unlocking content related to the first virtual entity in the virtual space.

9. The method of claim 8, wherein the unlocked content is determined based on play criteria associated with the first toy object, the unlocking of the content being responsive to the play criteria being met, the determination of whether the play criteria has been met being based on the first play information.

10. The method of claim 9, wherein the play criteria include criteria related to one or more of a quantity of gaming platforms used with the first toy object, geo-locations of gaming platforms, or owners of gaming platforms.

\* \* \* \* \*

UNITED STATES PATENT AND TRADEMARK OFFICE
CERTIFICATE OF CORRECTION

Page 1 of 1

PATENT NO.       : 9,610,500 B2
APPLICATION NO.  : 13/841813
DATED            : April 4, 2017
INVENTOR(S)      : Tyler James Colbert It is certified that error appears in the above-identified patent and that said Letters Patent is hereby corrected as shown below:

On the Title Page

Item (73) Assignee, please change:
"Disney Enterprise, Inc., Burbank, CA (US)"

To:
--Disney Enterprises, Inc., Burbank, CA (US)--.

Signed and Sealed this
Third Day of October, 2017

Joseph Matal
*Performing the Functions and Duties of the*
*Under Secretary of Commerce for Intellectual Property and*
*Director of the United States Patent and Trademark Office*